United States Patent [19]
Nagayama et al.

[11] 3,919,300

[45] Nov. 11, 1975

[54] DETERGENT COMPOSITION AND METHOD FOR PREPARING SAME

[75] Inventors: Masuzo Nagayama; Hiroshi Okada, both of Tokyo, Japan

[73] Assignee: Lion Fat & Oil Co., Ltd., Tokyo, Japan

[22] Filed: July 18, 1973

[21] Appl. No.: 380,284

Related U.S. Application Data

[62] Division of Ser. No. 827,232, May 23, 1969, Pat. No. 3,769,332.

[30] Foreign Application Priority Data

May 25, 1968 Japan.............................. 43-35339
Sept. 7, 1968 Japan.............................. 43-64448

[52] U.S. Cl............................................. 260/513 R
[51] Int. Cl.².................................... C07C 143/16
[58] Field of Search.................. 260/513 R, 504 R

[56] References Cited
UNITED STATES PATENTS

| | | | |
|---|---|---|---|
| 3,428,654 | 2/1969 | Rubinfeld et al. | 260/513 R |
| 3,531,518 | 9/1970 | Ohren et al. | 260/513 R |
| 3,535,339 | 10/1970 | Beyer et al. | 260/513 R |

*Primary Examiner*—Bernard Helfin
*Assistant Examiner*—Nicky Chan
*Attorney, Agent, or Firm*—Woodhams, Blanchard and Flynn

[57] ABSTRACT

A sulfonated α-olefin reaction product containing less than about 8% by weight of Δ'-alkenesulfonate, based on the total amount of alkenesulfonates in the reaction product, is prepared by (1) sulfonating α-olefin, (2) allowing the product to step (1) to stand at 20° to 100°C for 1 to 5 hours under anhydrous conditions, (3) neutralizing the product of step (2), and (4) subjecting the product of step (3) to a temperature of 130° to 180°C for from 5 minutes to 2 hours.

2 Claims, 1 Drawing Figure

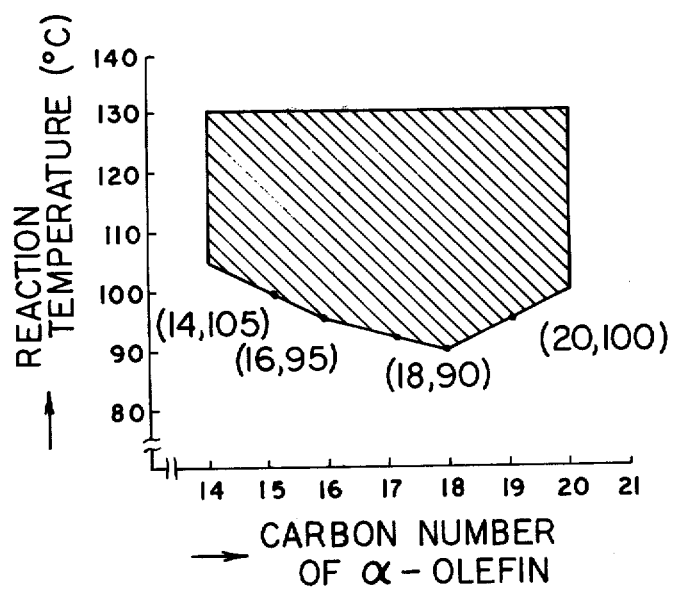

DETERGENT COMPOSITION AND METHOD FOR PREPARING SAME

This is a division, of application Ser. No. 827 232, filed May 23, 1969, now U.S. Pat. No. 3,769,332.

BACKGROUND OF THE INVENTION

1. Field of the Invention:

This invention relates to an improved method for preparing α-olefinsulfonates, more particularly, a method for preparing α-olefinsulfonates by contacting α-olefins of $C_{10}$ - $C_{25}$ in the form of a thin film with sulfur trioxide, wherein the improvement comprises varying the sulfonation temperature and the conditions of treating α-olefinsulfonates obtained by the sulfonation.

2. Description of the Prior Art:

Olefinsulfonates can generally be prepared by neutralizing and hydrolysing the sulfonated products which have been obtained by sulfonating olefins under suitable conditions. Since olefinsulfonates thus obtained are low in cost and have excellent surface activity, they have recently become a primary ingredient of detergents. The products obtained by sulfonating olefins, however, usually contain an ingredient that becomes a sulfonate having one double bond, or an ingredient that becomes an alkenesulfonate, when they are neutralized and hydrolysed. Olefinsulfonates consist essentially of said alkenesulfonates and hydroxyalkenesulfonates, of which the alkenesulfonates amount to about 40–80 percent by weight, although the alkenesulfonate content varies somewhat depending upon the conditions of sulfonation and hydrolysis. Since the alkenesulfonates thus obtained are subject to autoxidation, the olefinsulfonate surface active agent which contains such alkenesulfonates can become rancid. For instance, a powdery olefinsulfonate gives off an offensive odor and shows a remarkable discoloration especially due to acidification, and a liquid detergent becomes discolored and deforms the detergent container, the deformation of the container being caused by the consumption of oxygen in the container due to the acidification of the detergent. In order to prevent such acidification of the detergent, more particularly the autoxidation of alkenesulfonates, it has hitherto been practised to add a suitable antioxidant to olefinsulfonates; however, the effect has not been satisfactory.

SUMMARY OF THE INVENTION

An object of this invention is to provide a method for preparing α-olefinsulfonates which are satisfactorily resistive to autoxidation.

The other object of this invention is to provide a method for preparing α-olefinsulfonates containing $\Delta'$-alkenesulfonate in an amount less than 8% by weight of the entire weight of alkenesulfonates.

The aforementioned objects and other objects of the present invention shall be clearly understood from the following explanation. The present invention has been made based on the discovery of the inventors concerning the correlation between the position of a double bond and the autoxidation of alkenesulfonates, and thus the development of a detergent composition consisting of olefinsulfonates that will not acidify has been achieved by specifying the position of the double bond of alkenesulfonates. More particularly, it has been found that there is a close relationship between the autoxidation of alkenesulfonates, which causes acidifying, and the position of the double bond thereof, that alkenesulfonates containing $\Delta'$-alkenesulfonates which have a double bond between the carbon atom at 1-position and the carbon atom at 2-position counted from the carbon atom directly united with the sulfonic acid group is very unstable to oxidation, and that the presence of $\Delta'$-alkenesulfonate therefore is the principal cause of the acidification. Thus a detergent composition practically free from such defects as acidification can be prepared by using olefinsulfonates containing $\Delta'$-alkenesulfonates in an amount not in excess of 8% by weight of the total weight of alkenesulfonates. No definite reason can yet be set forth herein as to the relationship between the position of the double bond and the oxidation; however, it may be reasonably assumed that the double bond adjacent to the sulfonic acid group tends to polarize under the influence of the sulfonic acid group making it readily attacked by oxygen.

Olefinsulfonates are generally manufactured from α-olefin having $C_{10}$ - $C_{25}$ obtained by cracking petroleum waxes and polymerization of ethylene, wherein α-olefin is sulfonated by the use of a suitable sulfonating agent such as sulfur trioxide gas and the resultant product is neutralized and hydrolysed into olefinsulfonates. The α-olefinsulfonates (hereinafter called AOS) referred to in this invention can also be prepared according to the above-mentioned conventional method of manufacturing sulfonates. The α-olefin which is used in the present invention is one that has a carbon atom number in the range of 10 – 25, and other types of α-olefins such as one consisting of olefins having the same number of carbon atoms and a mixture of olefins whose number of carbon atoms differ. These α-olefins are not required to be pure and, any α-olefins whose unsaturated bonds are at β-position or that contain diolefins, paraffins and other impurities, so long as they are contained in small quantities, can be used as materials according to this invention. In short, olefins of all kinds can be used in this invention if they are obtained by the thermal cracking of petroleum waxes or the polymerization of ethylene and can practically be regarded as α-olefins. However, a good effect may be achieved by either raising the sulfonating temperature, or leaving the sulfonated compound, or adjusting the pH value below 7 in hydrolysing conditions, in order to control the amount of $\Delta'$-alkenesulfonates so that it does not exceed 8% of the whole quantity of alkenesulfonates as mentioned in the foregoing.

As for the practical application of this invention, there are two cases, namely one in which the sulfonation reaction is conducted at lower temperatures and the second in which such reaction is carried out at higher temperatures.

In case of the sulfonation at lower temperatures, an α-olefinsulfonic acid [AOS (acid)] is prepared by contacting α-olefin in the form of a thin film with gaseous sulfur trioxide in which the molar ratio of sulfurtrioxide to the α-olefin is 1.0–1.3 in the sulfonation reaction zone and the temperature is controlled to be about 80°C. or lower. When the succeeding hydrolysis step is to be commenced immediately, in one of embodiments of the invention, the hydrolysis should be conducted at a pH value below 7 after water or basic aqueous solution has been added to the resultant AOS (acid) and then neutralization should be conducted with the prescribed amount of alkali. When the succeeding step is to be commenced after the resultant AOS (acid) is left standing for a while, according to another embodiment of the invention, AOS (acid) should usually be left standing at from 20° to 100°C. under anhydrous conditions, neutralized by the addition of alkali and then hydrolysed. The temperature for leaving AOS (acid) standing should preferably be within the range between room temperature and approximately 50°C., and the time should be limited so that the AOS (acid) does not become substantially colored or smell offensively, preferably in the range of 1–5 hours.

On the other hand, when the sulfonation reaction is conducted at higher temperatures, the reaction temperature should be kept at 85°C. or higher. In a further embodiment of the invention, α-olefin in the form of a thin film is contacted with sulfur trioxide gas in a sulfonation reaction zone where at least one point is maintained at approximately 85°C. or higher to prepare AOS (acid). The resultant AOS (acid) is neutralized with alkali and then hydrolysed by a conventional method. Furthermore, in carrying out this invention, it is advisable to maintain the temperature of at least one point of the sulfonation reaction zone in the cross-hatched line area of FIG. 1 in relationship with the number of the carbon atoms of the α-olefin feed. More concretely speaking, in the case of $C_{14}$ the temperature ranges approximately from 105°–130°C; $C_{15}$, approximately 100°–130°C.; $C_{16}$, approximately 95°–130°C; $C_{17}$, approximately 92°–130°C.; $C_{18}$, approximately 90°–130°C.; $C_{19}$, approximately 95°–130°C.; $C_{20}$, 100°–130°C.; and in the case of the mixture thereof having different number of carbon atoms, a temperature range common to the respective components should be used. For instance, in the case of mixed components having $C_{15}$-$C_{18}$, the temperature approximately ranges between 100°C. and 130°C.

In manufacturing olefinsulfonates according to the present invention, disulfonates are also produced due to excess sulfonation; however, no ill effect will occur as a result of the production of disulfonates.

In the present invention, the reason for the decrease in the quantity of $\Delta'$-alkenesulfonate effected, for example, when the sulfonation reaction is conducted at higher temperatures may be explained as follows.

By the minus-inductive effect of the alkyl group, the carbon atom at 1-position of a long-chained α-olefin polarizes into minus. When electrophilic sulfur trioxide acts upon the aforementioned α-olefin, zwitter ions as indicated in the following chemical formula (Ia) are formed.

$$\overset{\delta-}{R-CH_2}-\overset{\delta-\oplus}{CH}=CH+\overset{\overset{101}{\|}}{\underset{\underset{101}{\|}}{S}}-\overset{\ominus}{O} \quad\quad \overset{\oplus}{RCH_2-CH}-CH_2-\overset{\ominus}{SO_2O}$$
$$\text{(Ia)}$$

By means of a proton elimination from one of the two methylene groups (or the methylene group which includes a 1-position carbon atom and 3-position carbon atom) positioning on the both sides of carbonium ion (2-position carbon atom), (Ia) further forms alkene-1-sulfonic acid (IIa) or alkene-2-sulfonic acid (IIb). In this proton elimination the carbon atom at 3-position takes precedence over the carbon atom at 1-position, therefore alkene-2-sulfonic acid is produced in quantity much more than alkene-1-sulfonic acid.

$$\overset{\oplus}{RCH_2-CH}-CH_2-\overset{\ominus}{SO_2O} \diagup^{RCH_2-CH=CH-SO_3H \text{ (IIa)}}_{RCH=CH-CH_2-SO_3H \text{ (IIb)}}$$
(Ia)

The twin ions (Ia) remain considerably stable in a reactant mixture at lower temperatures, but they are not stable under high temperatures condition and readily start hydride-shift. Because of this hydride-shift, (Ia) is converted into (Ib), (Ic) and (Id) to be stabilized, and they are further reformed into (IIb), (IIc), (IId), . . . due to proton elimination as shown in the following:

$$\overset{\oplus}{RCH_2CH_2CH_2-CH}-CH_2-\overset{\ominus}{SO_2O} \to RCH_2CH_2CH_2CH=CHSO_3H \quad \text{(IIa)}$$
(Ia)

$$\overset{\oplus}{RCH_2CH_2-CH}-CH_2CH_2-\overset{\ominus}{SO_2O} \to RCH_2CH_2CH=CHCH_2SO_3H \quad \text{(IIb)}$$
(Ib)

$$\overset{\oplus}{RCH_2-CH}-CH_2CH_2CH_2-\overset{\ominus}{SO_2O} \to RCH_2CH=CHCH_2CH_2SO_3H \quad \text{(IIc)}$$
(Ic)

$$\overset{\oplus}{R-CH}-CH_2CH_2CH_2-\overset{\ominus}{SO_2O} \to RCH=CHCH_2CH_2CH_2SO_3H \quad \text{(IId)}$$
(Id)

As seen from the above formulas, the quantity of $\Delta'$-alkenesulfonats decreases when the reaction is conducted at higher temperatures due to the formation of isomers having a double bond at different positions.

As for sulfonation equipment (sulfonator), a continuous film reactor or forced film reactor is used and the form of the film to be used in such reactors may be of slot type, shell type or annular type. There are no rigid limits as to the inner diameter and the length of the sulfonator and a wide choice can be made freely as to its size ranging from a laboratory size unit up to an industrial one. A reactor which is suitable for practicing this invention is a continuous sulfonator which is capable of conducting sulfonation of high standard. The continuous sulfonator mentioned in the foregoing, however, should have a heating surface as large as possible and be equipped with a heat exchanger which is capable of controlling the temperature inside the sulfonator by the use of a thermal medium. In order to measure the reaction temperature in the reactor, the sulfonator should be designed so that thermometers can be inserted in the sulfonator at least at three places, namely, at the upper, middle and lower parts (preferably more than three places).

When sulfonation is conducted at relatively higher temperatures, the temperature of the α-olefin material at the time of feeding it to the reactor is almost neglible and does not present any difficult problems. An α-olefin having a carbon chain whose length is within the range of $C_{10}$-$C_{25}$ requires a temperature several degrees (C.) higher than the melting point of material α-olefin (for instance, −5°C. in case of olefin having $C_{14}$); however, even when sulfonation was conducted with α-olefin material of higher temperature, its sensible heat is not significant as compared with the heat of reaction and its temperature is not a determining factor in the high temperature sulfonation.

As for the sulfonating agent which is used in the reaction conducted according to the present invention, sulfur trioxide obtained by a process of sulfur-burning or stabilized sulfur trioxide can be used. Sinc sulfonated AOS (acid) is sometimes carbonized or produces a substance which can not be bleached by the bleaching method mentioned hereinafter, the concentration of sulfur trioxide (sulfur trioxide is usually diluted with an inert gas) used in accordance with the present invention should be within the range of 1–10 vol.%, and it is especially advisable to adjust the concentration within the range of 2–4 vol.%. The temperature of the mixed gas of sulfur trioxide is most suitable for the purpose when it ranges between 30°C. and 100°C. A temperature ranging from 40°C. to 50°C is satisfactory for α-olefins whose number of carbon ranges between $C_{10}$ and $C_{25}$ which are usually used as materials for detergents. The mole ratio of sulfur trioxide to α-olefin has a great influence on the rate of reaction and the yield of disulfonates and since the reaction heat of α-olefin is high as compared with that of alkyl benzene (approximately 230 Kcal/1kg α-olefin) its influence on the reaction temperature is also great. The mole ratio of sulfur trioxide to α-olefin is therefore an important factor in the sulfonation of α-olefin. The sulfonation reaction of α-olefin is usually conducted with the mole ratio of sulfur trioxide to α-olefin ranging from 0.9 to 1.25. In the sulfonation conducted at relatively high temperature, mole ratios between 1.0 and 1.15 are preferably adopted.

The sulfonation of α-olefin is conducted by contacting α-olefin with a mixed gas of sulfur trioxide while α-olefin flows down in the form of a thin film through the reaction zone of the reactor. The length of the reaction tube where the sulfonation reaction takes place is generally 50–1,000 cm. Although it depends upon the type of the reactor, the sulfonation reaction can be satisfactorily achieved only by this thin film reaction if the length of the tube in longer than 100cm.

In carrying out the present invention, it is necessary to control the reaction temperature required for the sulfonation reaction within the range of temperatures mentioned later, and in order to do so, it is advisable to install thermometers to measure the temperature of the reaction zone at at least three points as mentioned in the foregoing. When the sulfonation is to be conducted at relatively high temperatures, the following precaution should be taken. In order to prepare AOS which contains a small amount of $\Delta^1$-alkenesulfonate, a higher temperature should, of course, be maintained in the initial stage of the reaction and the reaction zone should also be maintained at a high temperature until the conversion of α-olefin to AOS is fully started. Here the reaction of α-olefin with sulfur trioxide proceeds at a high velocity and also gives off a great heat of reaction. The temperature rises at its highest rate in the reaction area extending about 70cm from the point where the two come into contact, and thereafter the rate of increase of the reaction temperature somewhat decreases since the major portion of the reaction is now over. It may be said that the purpose is mostly achieved, if the temperature of the reaction area is kept high until the greater portion of the reaction is completed. The same thing can be said of sulfonation conducted at relatively lower temperatures and it is important to conduct the sulfonation reaction at suitable temperatures. Therefore, the reactor to be used in this invention should be so designed as to have a heating surface large enough to adjust the temperature promptly and at the same time the temperature in the reactor must be controlled most carefully by the proper use of a heating medium. Water is usually used in adjusting the temperature and it is needless to mention that cooling and heating are both required in this temperature adjustment. In this invention, the sulfonation at relatively lower temperatures is conducted at a temperature lower than approximately 85°C. and the sulfonation at relatively high temperatures in conducted at a temperature higher than approximately 85°C. In case of the sulfonation conducted at higher temperatures, the range of the reaction temperatures at the time of the sulfonation reaction should preferably be maintained in consideration of its relationship with the number of the carbon atoms of the α-olefin. In this case, it is necessary to maintain the temperature indicated by one of the thermometers fitted at the upper, middle and lower parts of the reactor in the cross-hatched zone of the drawing.

In the sulfonation, most of the reaction (reaction percentage, more than 85%) is nearly completed in the zone extending 120 cm from the point where α-olefin starts contacting the sulfur trioxide. Therefore the desired result is obtained by maintaining the suitable temperature in the said zone. In order to complete the reaction by continuing the reaction, a sulfonator equipped with an after-reaction apparatus is sometimes used; however, the temperature during the after-reaction scarcely exerts any influence on the attainment of the object of the present invention. Accordingly the temperature of the after-reaction may be maintained at lower temperatures (approximately near ambient temperature) so that the treatment of the reaction products (neutralization and hydrolysis) mentioned hereinafter may be conducted satisfactorily. The time required for the first part of the sulfonation where the reaction is conducted by contactinig α-olefin with sulfur trioxide ranges between 10 and 60 seconds and the total time including the time required for said after-treatment is less than 15 minutes. The pressure in the reaction system is maintained approximately at 0.3–2 kg/cm²G since the mixed gas of sulfur trioxide is used with accelerated velocity.

AOS (acid) thus prepared by the sulfonation reaction is hydrolysed after having been neutralized (or neutralized after having been hydrolysed), and bleached, if necessary, to obtain α-olefin sodium sulfonates or AOS-Na.

An explanation will first be given hereinafter on the process of treating AOS (acid) obtained by the sulfonation reaction conducted at relatively higher temperatures. In this case, the neutralization of AOS (acid) is conducted either by a continuous type process during a time period ranging 5 seconds to 1 hour or a batch type process, by the use of 10–15% aqueous solution of caustic soda usually at 40°–60°C. with high speed stirring. The aforementioned aqueous solution of caustic soda contains NaOH 0.6–1.0 equivalent molar weight to the sulfur trioxide which was used in preparing AOS (acid). The neutralized product is then hydrolysed at 100°C and sultones contained therein are decomposed into alkenesulfonates and hydroxyalkanesulfonates. In this hydrolysing process, the quantity NaOH affects the yield of alkenesulfonate considerably. In the pH region of 7 to 11, the mixture after the hydrolysis yields more hydroxyalkanesulfonate than when the pH value is higher than 11; however, the position of the double bond in alkenesulfonate is scarcely affected by the pH value. When the temperature at the time of hydrolysing (the lower the temperature, the longer is the hydrolysing time and the higher the temperature, the shorter is the hydrolysing time) is in the region of 130°–180°C., the hydrolysing temperature scarcely affects the position of the double bond in the alkenesulfonate. Judging from this point of view, it is desirable to conduct the hydrolysis under the following conditions;

| | |
|---|---|
| Hydrolysing temperature: | 130–180°C. |
| Hydrolysing time: | 5 minutes to 2 hours |
| pH value after hydrolysis: | 7–14 |

On the other hand, the method of treating AOS (acid) obtained by the relatively low temperature sulfonation reaction is as follows. When this AOS (acid) is treated immediately, it is diluted by adding water in an amount about twice the quantity of AOS (acid) and is hydrolysed. The pH at the time of the hydrolysis is naturally lower than 7. The temperature and the time of the hydrolysis are the same as those required by AOS (acid) obtained by the relatively high temperature sulfonation reaction. The hydrolysate is then neutralized with alkali and the conditions of this neutralization are the same as those required for AOS (acid) obtained by the relatively high temperature sulfonation reaction. Now in the treatment of AOS (acid) left standing for a while after it has been prepared by the relatively low temperature sulfonation reaction, neutralizing and hydrolysing are conducted in the same way as in the case of AOS (acid) prepared according to the relatively high temperature sulfonation reaction, after it has been left standing for 1–5 hours at from 20° to 100°C under anhydrous conditions. Neutralization of AOS (acid) is conducted either by a continuous type process during a time period ranging from 5 seconds to 1 hour or a batch type process, by the use of 10–15% aqueous solution of caustic soda usually at 40°–60°C with high speed stirring. The aforementioned aqueous solution of caustic soda contains NaOH 0.6–1.0 equivalent molar weight to the sulfur trioxide which was used in preparing AOS (acid). The neutralized product is then hydrolyzed at 100°C and sultones contained therein are decomposed into alkenesulfonates and hydroxyalkanesulfonates. In this hydrolyzing process the quantity of NaOH affects the yield of alkenesulfonate considerably. In the pH region of 7 to 11, the mixture after hydrolysis yields more hydroxyalkane sulfonate than when the pH value is higher than 11; however, the position of the double bond in alkenesulfonate is scarcely affected by the pH value. When the temperature at the time of hydrolysing (the lower the temperature, the longer is the hydrolysing time and the higher the temperature, the shorter is the hydrolysing time) is in the region of 130°–180°C., the hydrolysing temperature scarcely affects the position of the double bond in the alkenesulfonate. Judging from this point of view, it is desireable to conduct the hydrolysis under the following conditions;

Hydrolysing temperature: 130°–180°C.
Hydrolysing time: 5 minutes to 2 hours
pH value after hydrolysis: 7–14

AOS-Na thus obtained can be used in some fields without any further treatment; however, when it is used as an active ingredient in a detergent, AOS-Na may be bleached by the use of such bleaching agents as sodium hypochlorite, if necessary.

The bleaching is conducted by adding an aqueous solution of sulfuric acid (20–98%) to an AOS-Na solution, adjusting the pH of the mixed solution to be in the region of 7.0–11.0, and adding a bleaching agent such as sodium hypochlorite mentioned above at 50°–80°C. for 0.5–3.0 hours with stirring. In the bleaching process, the amount of sodium hypochlorite to be added to the mixed solution is 0.1–5% by weight of AOS-Na, treated preferably 0.5–3%. AOS-Na having a light color tone is thus obtained and it is satisfactory enough to be used as a surface active ingredient of the detergent.

AOS (acid) obtained by the sulfonation reaction according to any of the methods provided by the present invention contains 20–60% by weight of isomers of alkene-1-sulfonate (provided that the content of $\Delta^1$-alkenesulfonate ranges between 0–8% by weight), 20–60% by weight of sultones (such as 1,3-sultone, 1,4-sultone) and also 0–25% by weight of disulfonates having the multifunctional group (such as alkenedisulfonate, sultone sulfonic acid, etc.). The final product AOS-Na contains 20–50% of dried solid matters whose break-down is as follows:

| | |
|---|---|
| Alkenesulfonate | 40–80% |
| Hydroxyalkanesulfonate | 30–60% |
| Disulfonates having the multi-functional group (including alkanedisulfonate and hydroxyalkanedisulfonate) | 0–25% |

Incidentally, the abovementioned alkenesulfonate contains 0–8% by weight of $\Delta^1$-alkenesulfonate.

BRIEF DESCRIPTION OF THE DRAWING

The attached drawing is a graph showing the temperature of the sulfonation reaction provided in the present invention versus the number of carbon atoms in the α-olefin feed.

DESCRIPTION OF THE PREFERRED EMBODIMENTS

EXAMPLE 1

Ethylene was polymerized by the use of Ziegler's catalyst and then an α-olefin having $C_{14}$ was obtained from the polymerization product by means of fractional distillation. Using this olefin as a feed, α-olefinsulfonic acid was obtained at the rate of 6g. per minute by sulfonating the aforementioned olefin by the use of approximately 3% sulfur trioxide (sulfur trioxide/α-olefin molar ratio was 1.2), which had been diluted with nitrogen gas, in a reactor whose temperatures were adjusted at 48°C. and 80°C. respectively on the continuous thin film type sulfonator of a laboratory size.

The α-olefinsulfonic acid thus obtained was treated as mentioned below to obtain four kinds of sodium salts of α-olefinsulfonic acids:

I. One which was obtained by immediately adding α-olefinsulfonic acid obtained at the temperature of 48°C. to an aqueous solution of sodium hydroxide (10%) containing sodium hydroxide equivalent in molecular weight to the sulfur trioxide which had been used at the time of sulfonation and then hydrolysing a mixture at the temperature higher than 100°C.

II. One which was obtained by treating the same α-olefinsulfonic acid, that was used in (I), according to the same method as mentioned in (I) after it has been left to stand at 50°C. for 5 hours under anhydrous condition.

III. One which was obtained by adding water in a quantity twice the amount of α-olefinsulfonic acid to α-olefin sulfonic acid, thus maintaining the pH below 7, to hydrolyse the mixture and then neutralizing the hydrolysate with an aqueous solution of sodium hydroxide.

IV. One which was obtained by immediately adding sodium hydroxide to α-olefinsulfonic acid prepared at a temperature of 85°C. where the quantity of sodium hydroxide was equivalent in molecular weight to the sulfur trioxide used in preparing said α-olefinsulfonic acid and then hydrolysing the mixture.

These four kinds of α-olefinsulfonates were subjected to processes by means of which alkali, free oils and sodium sulfate were respectively removed from said α-olefinsulfonates, from which disfulonate was eliminated and monosulfonate only was obtained by means of extraction conducted with a 60-step counter current distribution using water-saturated butanol and butanol-saturated water. After this process, the double bond of the alkenesulfonate contained in sulfonate was made into carboxylic acid by means of oxidative decomposition conducted according to the method of Von Rudloff (see "Journal of American Oil Chemists' Society," volume 33, 126 page (1956)). Carboxylic acid was further made into a methyl ester by the use of diazomethane and was analyzed by gas chromatography. With each of the methyl carbonates having different numbers of carbon atoms obtained by gas chromatgraphic analysis, the positions of the double bonds of the respective alkenesulfonates were measured and the content percentage of $\Delta^1$-$\Delta^{13}$alkenesulfonate in the whole alkenesulfonates was obtained as shown in Table 1.

Table 1

| Position of Double Bond | (I) (wt.%) | (II) (wt.%) | (III) (wt.%) | (IV) (wt.%) |
|---|---|---|---|---|
| 1 | 24.3 | 6.1 | 0.2 | 1.2 |
| 2 | 45.1 | 55.00 | 47.2 | 56.8 |
| 3 | 14.5 | 18.8 | 24.5 | 19.6 |
| 4 | 8.4 | 11.3 | 17.4 | 12.0 |
| 5 | 3.2 | 4.0 | 6.9 | 4.6 |
| 6 | 2.5 | 2.4 | 2.7 | 3.3 |
| 7 | 0.8 | 0.9 | 0.7 | 1.2 |
| 8 | 0.6 | 0.7 | 0.3 | 0.9 |
| 9 | 0.3 | 0.4 | 0.1 | 0.3 |
| 10 | 0.2 | 0.3 | trace | 0.1 |
| 11 | 0.1 | 0.1 | — | trace |
| 12 | trace | trace | — | — |
| 13 | — | — | — | — |
| Alkene-sulfonates (wt.%) | 58.0 | 58.1 | 78.9 | 56.9 |
| Hydroxyalkane-sulfonate (wt.%) | 42.0 | 41.9 | 21.1 | 43.1 |
| Disulfonate* (wt.%) | 12.0 | 12.0 | 12.0 | 13.0 |

*Measured with samples before extraction by counter current distribution.

Four types of liquid detergents were prepared from the mixed solutions each containing one of the four kinds of α-olefinsulfonates having $C_{14}$ amounting to 20 and 15% of urea as a hydrotrope and 400 cc cylindrical containers made of polyethylene were filled with the respective detergents up to 90% of their capacity and were covered tightly. Then these containers were put in the temperature controlled atmosphere maintained at 50°C. and also left in the open air for a period of 1 month and it was found that the liquid detergent containing sulfonate (I) had an offensive smell, showed a changed color tone, and the containers were badly deformed, while those liquid detergents containing sulfonates (II), (III) and (IV) did not have a foul smell, showed no substantial change of their color tone and their containers scarcely showed any noticable deformation either.

EXAMPLE 2

Ethylene was polymerized by the use of Ziegler's catalyst and the resultqant polymerization produce was fractionally distilled to obtain α-olefin having $C_{16}$. This olefin was then used as a feed to prepar α-olefinsulfonic acid, wherein said olefin was sulfonated at the reaction temperatures of 48°C. and 85°C. respectively using sulfur trioxide (sulfur trioxide/α-olefin molar ratio is 1.15) diluted with dry air in an industrial size sulfonator as disclosed in the official gazette, Japanese Patent Office Gazette No. 42-252, to obtain α-olefinsulfonic acid at the rate of 1050 kg/hour.

α-olefinsulfonic acid prepared in this way was given the undermentioned treatments and four kinds of sodium salts of α-olefinsulfonic acid were obtained.

I'. α-olefinsulfonic acid obtained by sulfonation at the temperature of 48°C. was immediately neutralized with sodium hydroxide equivalent in molecular weight to the amount to sulfur trioxide which had been used at the time of sulfonation and then was hydrolysed at the temperature higher than 100°C.

II'. One obtained by maintaining the same α-olefinsulfonic acid as used in (I') at room temperature for 1 hour and then treating in the same way as (I').

III'. One obtained by adding water equal in quantity to α-olefinsulfonic acid, the same one as prepared in (I'), to hydrolyzes same at an acid pH, and then neutralizing same by adding an aqueous solution of sodium hydroxide in such a quantity as to adjust the pH of the mixed solution to 7.

IV'. One obtained by immediately adding sodium hydroxide, equivalent in molecular weight to the amount of sulfur trioxide used in the sulfonation, to α-olefinsulfonic acid prepared at the temperature of 85°C. and hydrolysing the mixture.

The position of the double bond of alkenesulfonates contained in the abovementioned four types of α-olefinsulfonates as principal ingredient was measured according to the method mentioned in Example 1 and the results thus obtained are shown in Table 2.

Table 2

| Position of Double Bond | (I') (wt.%) | (II') (wt.%) | (III') (wt.%) | (IV') (wt.%) |
|---|---|---|---|---|
| 1 | 22.1 | 7.8 | 0.1 | 1.8 |
| 2 | 44.5 | 54.2 | 45.8 | 55.1 |
| 3 | 15.7 | 18.3 | 25.1 | 18.9 |
| 4 | 8.8 | 10.5 | 18.0 | 11.9 |
| 5 | 3.5 | 4.2 | 7.1 | 5.5 |
| 6 | 2.5 | 2.6 | 2.7 | 3.0 |
| 7 | 1.0 | 0.9 | 0.7 | 1.2 |
| 8 | 0.8 | 0.6 | 0.3 | 0.8 |
| 9 | 0.4 | 0.4 | 0.1 | 0.8 |
| 10 | 0.3 | 0.3 | 0.1 | 0.4 |
| 11 | 0.2 | 0.1 | trace | 0.3 |
| 12 | 0.1 | 0.1 | — | 0.2 |
| 13 | 0.1 | trace | — | 0.1 |
| 14 | trace | — | — | trace |
| 15 | — | — | — | — |
| Alkenesulfonate (wt.%) | 53.8 | 54.0 | 78.5 | 52.3 |
| Hydroxyalkanesulfonate (wt.%) | 46.2 | 46.0 | 21.5 | 47.7 |
| Disulfonate* (wt.%) | 10.0 | 10.0 | 10.0 | 9.7 |

*Measured with samples before extraction by counter current distribution.

Four types of powdery heavy duty detergents were prepared, each consisting of 20% by weight of one of four kinds of the above-mentioned α-olefinsulfonates, 30% by weight of sodium tri-polyphosphate and sodium sulfate making up the balance. These four types of detergents were placed in tightly closed containers and kept in the thermo-hygrostat at 50°C. and 80% RH for a period of one month. The change of their properties versus time was observed and it was found that the detergent containing (I') showed deteriorations such as foul smell and discoloration, while each of the detergents containing (II'), (III') and (IV') showed no or very little of such deteriorations.

EXAMPLE 3

α-olefin having $C_{15}-C_{18}$ obtained by cracking and fractional distillation of petroleum waxes was sulfonated under the same conditions given in Example 2 except that the temperatures were adjusted to 48°C. and 90°C. in this example. The two types of α-olefinsulfonic acids thus obtained were neutralized respectively with sodium hydroxide equivalent in molecular weight to the amount of sulfur trioxide which was used at the time of sulfonation and then hydrolysed at a temperature higher than 100°C. to obtain α-olefinsulfonates having $C_{15}-C_{18}$. Since the number of carbon atoms of alkenesulfonates contained in these two types of olefinsulfonates lies within a certain range, it is impossible to classify them by the position of their double bonds according to the method adopted in Example 1; however, it may fairly be presumed that the content of $\Delta^1$-alkenesulfonate is smaller in α-olefinsulfonate obtained by the reaction conducted at 90°C. than in α-olefinsulfonate obtained by the reaction conducted at 48°C. judging from the results obtained in Example 2.

Two kinds of powdery light duty detergents consisting of 25% by weight of α-olefinsulfonate, 3% by weight of sodium tri-polyphosphate and sodium sulfate making up the balance were prepared, each detergent having one of the said two α-olefinsulfonates. These detergents were respectively placed in tightly closed containers and put in the thermo-hygrostat at 50°C. and 65% RH for the period of 1 month to observe the change of properties versus time. The detergent containing α-olefinsulfonate prepared at 48°C. underwent noticable deterioration in its smell and color, while the detergent containing α-olefinsulfonate prepared at 90°C. scarcely showed such deterioration.

EXAMPLE 4

Ethylene was polymerized by the use of Ziegler's catalyst and the polymerization product was subjected to fractional distillation to obtain α-olefin having $C_{14}$. This olefin was sulfonated in a continuous thin film type laboratory sulfonator. This reactor was made of Pyrex glass, having an inner diameter of 5 mm and a length of 120 cm, and was designed to contact α-olefin with sulfur trioxide while they flowed in parallel through the reactor. Thermometers were positioned at three points, 30 cm, 60 cm and 120 cm respectively from the point where the contact was started. The readings of the thermometers at the respective points are shown in Table 3. As for the conditions of the reaction, the concentration of sulfur trioxide was 2.8 vol.% (diluted with nitrogen gas), sulfur trioxide/α-olefin molar ratio was 1.20, contact time was 30 seconds, α-olefin feeding rate was 6 ml/minute and the temperature of α-olefin at the time of feeding was 30°C.

Table 3

| Location of Thermometers | 30 cm | 60 cm | 120 cm | Cooling Medium |
|---|---|---|---|---|
| I (Lower temperature reaction) | 50°C. | 48°C. | 43°C. | water (37°C.) |
| II Higher temperature reaction) | 110°C. | 100°C. | 95°C. | water (95°C.) |

The resultant two kinds of α-olefinsulfonic acid were respectively neutralized with 10% aqueous solution of sodium hydroxide of a quantity equivalent in molecular weight to the amount of sulfur trioxide used at the time of sulfonation and then hydrolysed at 160°C. for 20 minutes to obtain AOS-Na. Treatments followed to remove alkali, free oils and sodium sulfate from these two kinds of AOS-Na respectively. Disulfonate was eliminated and monosulfonate only was obtained by an extraction process conducted with a 30-step counter current distribution using water-saturated butanol and butanol-saturated water. After the process, the double bond of alkenesulfonate contained in the sulfonate was made into carboxylic acid by means of oxidation decomposition conducted according to the method of Von Rudloff (see "Journal of American Oil Chemists' Society," volume 33, 126 page (1956)). Carboxylic acid was further made into methyl ester by the use of diazomethane and was analyzed with gas chromatography. With each of the methyl carbonates having different number of carbon atoms obtained by gas chromatographic analysis, the positions of the double bonds of respective alkenesulfonates were measured and the content percentage of $\Delta^1 - \Delta^{13}$ alkenesulfonates in the whole alkenesulfonates was obtained. The results are shown in Table 4.

Table 4

| Position of Double Bond | I | II |
|---|---|---|
| 1 | 24.3 | 0.2 |
| 2 | 45.1 | 26.7 |
| 3 | 14.5 | 34.6 |

Table 4-continued

| Position of Double Bond | I | II |
| --- | --- | --- |
| 4 | 8.4 | 20.0 |
| 5 | 3.2 | 9.6 |
| 6 | 2.5 | 5.3 |
| 7 | 0.8 | 2.0 |
| 8 | 0.6 | 1.1 |
| 9 | 0.3 | 0.4 |
| 10 | 0.2 | 0.1 |
| 11 | 0.1 | trace |
| 12 | trace | — |
| 13 | — | — |
| Alkenesulfonate (wt.%) | 58.0 | 59.2 |
| Hydroxyalkane-sulfonate (wt.%) | 42.0 | 40.8 |
| Disulfonate* (wt.%) | 12.0 | 13.0 |

*Measured with samples before extraction by counter current distribution.

Two types of liquid detergents were prepared from the mixed solutions each containing one of the four kinds of α-olefinsulfonate having $C_{14}$ amounting 20% by weight and 15% by weight of urea as a hydrotrope and a 400 cc cylindrical polyethylene containers were filled with the respective detergents up to 90% of their capacity and were stopped tightly. Then these containers were placed in the tempeature controlled atmosphere maintained at 50°C. and also left in open air for a total period of one month and it was found that the liquid detergent containing sulfonate (I) gave out an offensive smell, discolored, and the containers were badly deformed, while the liquid detergent containing sulfonate (II) did not give out a foul smell, showed no substantial change of the color tone and the containers scarcely showed any noticeable deformation either.

EXAMPLE 5

Ethylene was polymerized with Ziegler's catalyst and the polymerization product underwent fractional distillation to obtain α-olefin having $C_{16}$. This olefin was used as a material to prepare α-sulfonic acids, wherein said olefin was sulfonated by the use of sulfur trioxide (sulfur trioxide/α-olefin molar ratio was 1.15) diluted with dry air in an industrial size sulfonator used in Example 2, controlling the reaction temperatures at (III) 48°–65°C., (IV) 65°–80°C., (V) 95°–105°C., (VI) 100°–120°C. and (VII) 80°–95°C., to obtain α-olefin-sulfonic acids at the rate of 1050 kg/hour. Like Example 1, thermometers were equipped at three places of the 120-cm main reaction tube, that is, upper, middle and lower points (30 cm, 60 cm, 120 cm) to measure the reaction temperature. The results of the measurement are shown in Table 5.

Table 5

| Location of thermometer | 30 cm | 60 cm | 120 cm | Cooling medium |
| --- | --- | --- | --- | --- |
| | (°C.) | (°C.) | (°C.) | |
| III | 65 | 60 | 48 | water (15°C.) |
| IV | 80 | 75 | 65 | water (25°C.) |
| V | 105 | 100 | 95 | water (65°C.) |
| VI | 120 | 115 | 100 | water (80°C.) |
| VII | 95 | 90 | 80 | water (45°C.) |

The α-olefinsulfonic acids thus obtained were respectively neutralized with a 13% aqueous solution of sodium hydroxide of such a quantity as to make 0.8 equivalent in molecular weight to the amount of sulfur trioxide which was fed at the time of sulfonation and then hydrolysed at 160°C. for 20 minutes to obtain AOS-Na. Processes were then conducted to remove alkali, free oils and sodium sulfate from these five kinds of AOS-Na respectively. The position of the double bond of alkenesulfonate contained in α-olefinsulfonate as a principal ingredient was measured according to the method given in Example 1. The results are shown in Table 6.

Table 6

| Location of Double Bond | III | IV | V | VI | VII |
| --- | --- | --- | --- | --- | --- |
| 1 | 22.1 | 10.1 | 5.3 | 1.8 | 7.5 |
| 2 | 44.5 | 43.7 | 34.5 | 25.1 | 38.3 |
| 3 | 15.7 | 23.4 | 29.6 | 33.9 | 28.4 |
| 4 | 8.8 | 12.1 | 15.0 | 19.9 | 11.9 |
| 5 | 3.5 | 4.5 | 8.0 | 9.6 | 7.2 |
| 6 | 2.5 | 2.9 | 3.4 | 4.5 | 3.0 |
| 7 | 1.0 | 1.2 | 1.6 | 2.0 | 1.6 |
| 8 | 0.8 | 0.9 | 1.0 | 1.2 | 1.0 |
| 9 | 0.4 | 0.5 | 0.7 | 0.9 | 0.6 |
| 10 | 0.3 | 0.3 | 0.4 | 0.5 | 0.3 |
| 11 | 0.2 | 0.2 | 0.3 | 0.3 | 0.1 |
| 12 | 0.1 | 0.1 | 0.1 | 0.2 | 0.1 |
| 13 | 0.1 | 0.1 | 0.1 | 0.1 | trace |
| 14 | trace | trace | trace | trace | trace |
| 15 | — | — | — | — | — |
| Alkene-sulfonate (wt.%) | 53.8 | 54.0 | 54.1 | 54.5 | 54.0 |
| Hydroxyalkane-sulfonate (wt.%) | 46.2 | 46.0 | 45.9 | 45.5 | 46.0 |
| Disulfonate* (wt.%) | 10.0 | 9.8 | 9.8 | 9.7 | 9.8 |

*Measured with samples before extraction by counter current distribution.

By the use of five kinds of α-olefinsulfonates given in Table 6, five kinds of powdery heavy duty detergents were prepared, consisting of 20% by weight of α-olefinsulfonate, 30% by weight of sodium tri-polyphosphate and sodium sulfate making up the balance. These five kinds of detergents were respectively placed in tightly closed containers, which were then put in the thermohydrostat maintained at 50°C. and 80% RH for a period of 1 month to observe the changes of their properties during the period. The detergent containing (III) and (IV) showed changes such as development of foul smell, discoloration, etc., while the detergents containing (V), (VI) and (VII) respectively presented no such deteriorations. These three kinds of detergents were put in the thermo-hydrostat maintained at 50°C. and 80% RH for a further period of one month. Then the detergents containing (V) and (VI) showed no such deteriorations as mentioned above but the detergent containing (VII) showed some deteriorations, though neglible in amount.

In this invention, the $\Delta^1$-alkenesulfonate content of alkenesulfonates is limited within the range of 0–8%. This is because $\Delta^1$-alkenesulfonate is subject to autoxidation. Though it is necessary to reduce the $\Delta^1$-alkenesulfonate content as far as possible, it has been confirmed by experiments that, so long as the content thereof does not exceed 8%, there is no problem in practical use.

EXAMPLE 6

α-olefin having $C_{15}$-$C_{18}$ was obtained by cracking petroleum waxes and fractional distillation thereof and then sulfonation was conducted under the same conditions as given in Example 5. However, the reaction temperatures were adjusted to 48°–65°C and 100°–130°C. The two kinds of α-olefinsulfonic acids were neutralized with sulfur trioxide equivalent in molecular weight to the amount of sulfur trioxide used at the time of sulfonation and then hydrolysed at 160°C. for 10 minutes to obtain α-olefinsulfonates having $C_{15}$-$C_{18}$. The number of carbon atoms of alkenesulfonates contained in these two kinds of olefinsulfonates has a certain range, so it is difficult to classify them by the position of their double bond according to the method given in Example 1; however, it may fairly be presumed that the content of $\Delta^1$-alkenesulfonate is smaller in α-olefinsulfonate obtained by the reaction conducted at 100°–130°C than in α-olefinsulfonate obtained by the reaction conducted at 48°–65°C, judging from the results obtained in Example 2.

Two kinds of powdery light duty detergents consisting of 25% by weight of α-olefinsulfonate, 3% by weight of sodium tri-polyphosphate and sodium sulfate making up the balance were prepared, each detergent containing one of the said two α-olefinsulfonates. These detergents were respectively placed in tightly closed containers and put in the thermo-hygrostat at 50°C. and 65% RH for the period of one month to observe the change of properties versus time. The detergent containing α-olefinsulfonate prepared at 48-65°C. underwent noticeable deterioration in its smell and color, while the detergent containing α-olefinsulfonate prepared at 100°–130°C. scarcely showed any sign of such deterioration.

What we claim is:

1. A method for preparing a sulfonated reaction product containing less than about 8% by weight of $\Delta^1$-alkenesulfonate, based on the total amount of alkenesulfonates in the reaction product, which comprises:

1. flowing (A) a thin film of liquid α-olefin having from 10 to 25 carbon atoms through a reaction zone having a length of at least about 100 cm, and therein contacting said α-olefin with (B) a reactant gas containing from 1 to 10%, by volume, of $SO_3$ and the balance inert gas, the reactant gas being supplied at a rate in the range of from 0.9 to 1.25 moles of $SO_3$ per mole of α-olefin and the temperature of the reactant gas fed into the reaction zone being in the range of 30°C to 100°C, the pressure in the reaction zone being in the range of from 0.3 to 2 $kg/cm^2$ gauge, the α-olefin being present in the reaction zone for a time period in the range of from about 10 seconds to about 60 seconds, the sulfonation temperature in the reaction zone being maintained at a maximum temperature of not more than 85°C, to produce a sulfonation reaction product;
  2. then maintaining the entirety of the product of step 1, at a temperature of from 20° to 100°C for from 1 to 5 hours, under anhydrous conditions;
  3. and then neutralizing the entirety of the product of step 2 by adding thereto an aqueous solution of alkali in an amount of from about 0.6 to 1.0 moles equivalent based on the number of moles of $SO_3$ fed into the reaction zone, and
  4. subjecting the entirety of the product of step 3 at a temperature from 130°C to 180°C for a period of from 5 minutes to 2 hours to hydrolyze the sultones contained in the product of step 3 whereby to produce a sulfonated reaction product comprised of alkenesulfonates and hydroxyalkanesulfonates, said sulfonated reaction product having a pH of from 7–14.

2. A method according to claim 1, wherein in step 2, the maximum temperature is approximately 50°C.

* * * * *